United States Patent [19]

D'Agostino et al.

[11] Patent Number: 5,705,534
[45] Date of Patent: Jan. 6, 1998

[54] METHOD FOR THE PREPARATION OF CATION EXCHANGE MEMBRANES DOPED WITH INSOLUBLE METAL SALTS

[75] Inventors: Vincent F. D'Agostino, Dix Hills, N.Y.; Graham Edward Cooley, Oxon; John Michael Newton, Wiltshire, both of United Kingdom; Karel Bouchal, Smichov, Czech Rep.

[73] Assignee: National Power plc, Wiltshire, United Kingdom

[21] Appl. No.: 657,953

[22] Filed: Jun. 4, 1996

Related U.S. Application Data

[63] Continuation-in-part of Ser. No. 532,392, Sep. 22, 1995, abandoned.

[51] Int. Cl.$^6$ ............................................. C25B 13/08
[52] U.S. Cl. ........................... 521/27; 521/27; 521/28; 521/30; 521/32; 521/33; 204/296
[58] Field of Search ........................... 521/27, 28, 30; 204/296

[56] References Cited

U.S. PATENT DOCUMENTS

| 4,400,243 | 8/1983 | Ebdon | 204/1 |
| 5,167,875 | 12/1992 | De Rycke | 252/584 |

FOREIGN PATENT DOCUMENTS 28745  10/1995  WIPO.

*Primary Examiner*—Fred Zitomer
*Attorney, Agent, or Firm*—Antonelli, Terry, Stout & Kraus, LLP.

[57] ABSTRACT

A method of preparing a modified cation exchange membrane in which a sulfide of silver, tungsten, molybdenum or a mixture thereof is deposited within the polymer matrix, which method comprises the steps of:

i) forming within the polymer matrix of the membrane a complex of silver, tungsten, molybdenum or a mixture thereof with a water soluble compound containing an —SH group; and ii) converting the complex formed in step (i) into the insoluble sulfide of silver, tungsten, molybdenum or a mixture thereof.

10 Claims, 1 Drawing Sheet

METHOD FOR THE PREPARATION OF CATION EXCHANGE MEMBRANES DOPED WITH INSOLUBLE METAL SALTS

This is a continuation-in-part of application Ser. No. 08/532,392 filed Sep. 22, 1995 and now abandoned.

BACKGROUND OF THE INVENTION

The present invention relates to a method for the preparation of cation exchange membranes doped with insoluble metal salts and, in particular, to a method for the preparation of cation exchange membranes which have insoluble salts of silver, tungsten, molybdenum or a mixture thereof, deposited within the polymer matrix of the membrane. The insoluble salt which is deposited within the polymer matrix of the membrane is preferably a sulfide of silver, tungsten, molybdenum, or a mixture thereof.

PRIOR ART

Cation exchange membranes have been proposed for use in various electrochemical applications, including chlor-alkali cells, fuel cells and energy storage/power delivery devices. In these devices the cation exchange membrane serves to separate the compartments of the cells, whilst providing a conducting pathway for cations through the cell. For certain applications, such as for use in the chlor-alkali process or fuel cell applications, the membranes may also have metallic catalytic electrodes formed on the surface thereof. Proposals for the preparation of such membrane/electrode composites include the process as disclosed in U.S. Pat. No. 4,959,132 whereby a metallic catalytic film is formed on the surface of the membrane by the reduction of a water soluble metallic salt impregnated into the membrane to form the metal.

For use in electrochemical applications, a cation exchange membrane requires a high voltage efficiency, i.e. a low resistance. Low resistance membranes generally have a high water content and are not very selective, i.e. have a low current efficiency. What is required is a membrane with both low resistance and high selectivity.

In order to improve the permselectivity of cation exchange membranes, i.e. the ability of the membrane to allow cations to pass through it, whilst not allowing anions to pass through it, various approaches have been adopted.

One approach has been to make bi-layer membranes in which a low resistance membrane is surfaced on one side with an anion rejection layer of lower water content. This bi-layer membrane has a low resistance bulk portion with a surface layer which is highly cationically selective. Examples of such membranes are those in which a low ion exchange capacity (high equivalent weight) membrane provides the anion rejection surface layer (DuPont Nafion 300 series) and those in which a carboxylic acid membrane provides the anion rejection surface layer (DuPont Nafion 900 Series). These bi-layer membranes are surfaced on one side only for anion rejection in a specified direction. In both cases (300 and 900) anion rejection is achieved by reducing the water content of the surface of the membrane.

Another approach has been to precipitate silicon dioxide into Nafion sulfonic acid membranes in order to decrease the water content of the membrane. (Multiphase polymers-:blends and ionomers, Chapter 16, L. A. Utracki and R. A. Weiss, ACS Symposium series 395, Jun. 5–11 1988, p 401–417). This treatment results in an improved selectivity of the membrane by reducing the water content of the membrane, but increases the membrane resistance.

In our PCT Application PCT/GB95/00668 we have described a method of decreasing the water content of a cation exchange membrane for use in an electrochemical cell, whilst retaining the same ion exchange capacity and permselectivity. These cation exchange membranes, which have a low electrolytic resistivity with a high permselectivity, are produced by depositing an ionic salt which is a silver, tungsten or molybdenum salt or a mixture thereof, within the polymer matrix, the said salt being insoluble in the electrolytes which, in use, contact either side of the membrane. The insoluble ionic salt which is deposited within the polymer matrix of the membrane is preferably a bromide, chloride, sulfide or hydroxide of silver, tungsten or molybdenum, or mixtures thereof, more preferably a sulfide.

The method for depositing the insoluble ionic salt within the polymer matrix of the membrane, as disclosed in PCT/GB95/00668 comprises the steps of:

i) contacting the membrane with an aqueous solution of a water soluble salt, of silver, tungsten, molybdenum or mixtures thereof; and ii) converting the water soluble salt from step (i) into an insoluble salt.

The water soluble salts used in this method are preferably the nitrates and the preferred insoluble salts are the sulfides of the said metals which may be precipitated by treating the membrane with a suitable sulfide ion in solution, such as sodium sulfide.

A number of factors affect the preparation of insoluble metal sulfides in the polymer matrix of the membrane including:

i) the high concentration of ions adsorbed in the membrane suppresses the diffusions of $S^{2-}$ or $HS^-$ ions into the membrane; and ii) the low concentration of metal ions which are in equilibrium with the metal sulfide at the membrane—solution boundary leads to a concentration gradient which accelerates the diffusion of metal ions to the membrane—solution boundary.

As a result the metal sulfide is precipitated either at the membrane surface, or in the region of the polymer matrix adjacent to the membrane surface. A typical penetration depth is about 30% of the thickness from the surfaces of both sides of the membrane, thus leaving a deficient band in the centre of the membrane.

We have now developed an improved method for the preparation of cation exchange membranes which are doped with insoluble sulfides of silver, tungsten, molybdenum, or mixtures thereof.

SUMMARY OF THE INVENTION

Accordingly, the present invention provides a method of preparing a modified cation exchange membrane in which a sulfide of silver, tungsten, molybdenum or a mixture thereof is deposited within the polymer matrix, which method comprises the steps of:

i) forming within the polymer matrix of the membrane a complex of silver, tungsten, molybdenum or a mixture thereof with a water soluble compound containing an —SH group; and ii) converting the complex formed in step (i) into the insoluble sulfide of silver, tungsten, molybdenum or a mixture thereof.

DETAILED DESCRIPTION OF THE INVENTION

The membrane is preferably dehydrated prior to the treatment in step (i) above. The dehydration assists in the membrane absorbing the solution of the compound containing an —SH group.

One membrane which may be modified according to the present invention is a cation exchange membrane formed from a fluorocarbon polymer grafted with styrene via gamma irradiation and subsequently sulfonated to give sulfonic acid pendant chains or grafted via gamma irradiation with an unsaturated carboxylic acid, such as acrylic or methacrylic acid, to give carboxylic acid pendant chains. The fluorocarbon is preferably polytetrafluoroethylene, or a fluorinated ethylene-propylene copolymer. The membrane is prepared by grafting the styrene onto the fluorocarbon polymer using gamma irradiation and then sulfonating the grafted polymer, for example by using chlorosulfonic acid, or grafting an unsaturated carboxylic acid onto the fluorocarbon polymer using gamma irradiation.

The radiation grafting of vinyl-substituted monomers to polytetrafluoroethylene and polyolefin films is known in the art and reference is made to U.S. Pat. Nos. 4,230,549 and 4,339,473.

Another membrane which may be modified according to the present invention is a cation exchange membrane formed from a copolymer of tetrafluoroethylene and a sulfonated or carboxylated vinyl ether, such as those sold under the trade names of Nafion (Du Pont), for example Nafion 112,115 or 117, and Flemion (Asahi Glass).

Another membrane which may be modified according to the invention is a cation exchange membrane which is a polystyrene sulfonate membrane from Tokuyama Soda sold as Neosepta CM1, Neosepta CM2, Neosepta CMH and Neosepta CMS, and Selemion (Asahi Glass).

Other membranes which may be used in the present invention are heterogeneous membranes such as those based on polystyrene sulfonate ion exchange resin blended with another polymer such as polyethylene. Another type of membrane which may be used is a post-irradiation grafted membrane. Yet another type of membrane which may be used is a cross-linked aromatic polyamide, for example of the Kevlar type.

Preferably, in carrying out the method of the present invention, the cation exchange membrane impregnated with an aqueous solution of a silver, tungsten or molybdenum salt, or a mixture thereof, or with an aqueous solution of a chelate of silver, tungsten or molybdenum, or a mixture thereof, is contacted in step (i) with an aqueous solution of a water soluble compound containing an —SH group which is capable of forming a complex with silver, tungsten or molybdenum.

When the membrane is to be impregnated with silver sulphide, it is preferably contacted in step (i) of the method with a water soluble salt of silver, prior to impregnation of the membrane with the —SH containing compound. The water soluble salts generally used in carrying out this step of the method are the chloride, bromide or nitrate, most preferably the nitrate. Generally, in the formation of the impregnated membrane, the —SH compound will be at least in a stoichiometric excess as compared to the water soluble salt of silver.

When the membrane is to be impregnated with tungsten or molybdenum sulfide it is generally preferred to form a chelate complex of tungsten or molybdenum since some of the water soluble salts of tungsten and molybdenum, such as the chlorides, are prone to hydrolysis. Compounds with which water soluble chelate complexes can be formed by molybdenum and tungsten include 8-hydroxyquinoline, toluene-3,4-dithiol or benzoin α-oxime.

Suitable water soluble compounds containing an —SH group which may be used in the present invention are thio compounds such as isothiourea; thio acids, such as thioacetic acid; thioamides, such as thioformamide, thioacetamide or thiobenzamide; or mercaptans such as mercaptoalcohols, e.g. mercaptomethanol, 2-mercaptoethanol, 3-mercaptopropanol, 3-mercaptobutanol or 4-mercaptobutanol; or mercaptoacids, e.g. mercaptoacetic acid, 3-mercaptopropanoic acid or 4-mercaptobutanecarboxylic acid. Generally, the —SH group containing compound will be used in an excess, in order to ensure complete formation of the complex in step (ii) of the method.

Thiourea and isothiourea are in equilibrium in aqueous solution according to the following equation:

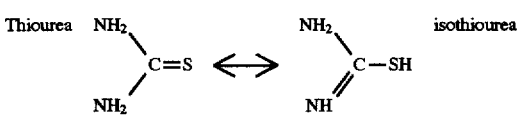

The SH form (isothiourea) can bind $Ag^+$ ions according to the following equation:

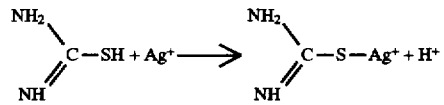

The alkaline hydrolysis of isothiourea with bonded $Ag^+$ ions is believed to proceed according to the following equations:

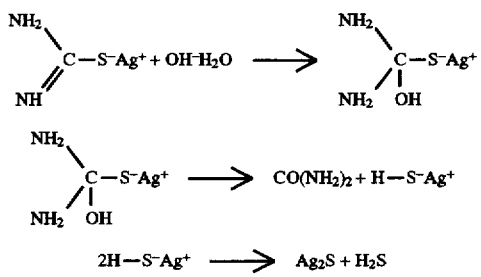

Any excess $H_2S$ formed in the reaction is neutralised by the alkaline medium, e.g. sodium hydroxide.

The mechanism of reaction of other —SH containing compounds with the silver salts, and their subsequent conversion into the corresponding sulfide is believed to proceed according to similar mechanisms to those as outlined above.

The alkaline hydrolysis in step (ii) of the method may be effected by the use of any suitable alkaline reagent, preferably sodium hydroxide or potassium hydroxide.

When the complex formed in step (i) of the method is a complex with a tungsten or molybdenum chelate, the preferred conversion route in step (ii) is heat treatment at an elevated temperature, for example in the range of from 150° to 250° C., preferably at 200° C. or above.

In the method of the present invention the complex of the metal with the —SH group containing compound is impregnated throughout the membrane prior to conversion into the insoluble metal sulfide. Accordingly, the disadvantages of the method as disclosed in PCT/GB95/00668 are overcome.

The electrochemical apparatus into which the modified membrane produced according to the method of the present invention is incorporated is preferably an apparatus for energy storage and/or power delivery. The electrolysis in the $^{-ve}$ chamber of the electrochemical apparatus preferably contains a sulfide during power delivery, whilst the electrolyte in the $^{+ve}$ chamber of the electrochemical apparatus preferably contains bromine, iron, air or oxygen, as described in PCT/GB95/00668.

The present invention will be further described with reference to the following Examples.

EXAMPLE 1

Perfluorinated sulphonic acid cation exchange membranes sold under the trade names of Nafion 115 or 117 (Du Pont), and cation exchange membranes formed from a polytetrafluoroethylene or a fluorinated ethylenepropylene copolymer grafted with styrene sulphonic acid end groups via gamma irradiation were pretreated by boiling in a 50/50 mixture of nitric acid (s.g. 1.42) and high purity water (18 MΩ) under reflux for 30 minutes. Polystyrene sulphonate cation exchange membranes from Tokuyama Soda sold as Neosepta CMH and Neosepta CM2 were pretreated by washing in high purity water using an ultrasonic bath, followed by rinsing in high purity water.

The pretreated perfluorinated cation exchange membranes were converted into the $Ag^+$ form by conditioning in an aqueous solution of $5 \times 10^{-3}M$ $AgNO_3$, stirred continuously and kept in the dark at room temperature for approx 670 hours (4 weeks). The polystyrene sulphonate membranes were conditioned in an aqueous solution of $5 \times 10^{-3}M$ $AgNO_3$, stirred continuously and kept in the dark at room temperature for 200 hours.

The $Ag^+$ exchanged membranes were rinsed in high purity water and dried with paper towels. The membranes were then immersed in an aqueous solution of $5 \times 10^{-3}M$ thiourea for a minimum of 48 hours. To increase the thiourea content of the membranes, they were transferred after doping in the aqueous solution of $5 \times 10^{-3}M$ thiourea into 1M thiourea for 48 hours.

The membranes were rinsed in high purity water, dried with paper towels and immersed in an aqueous solution of 1M NaOH at room temperature for 24 hours during which time they changed colour, indicating the formation of silver sulphide within the polymer matrix of the membrane.

EXAMPLE 2

Figure 1:
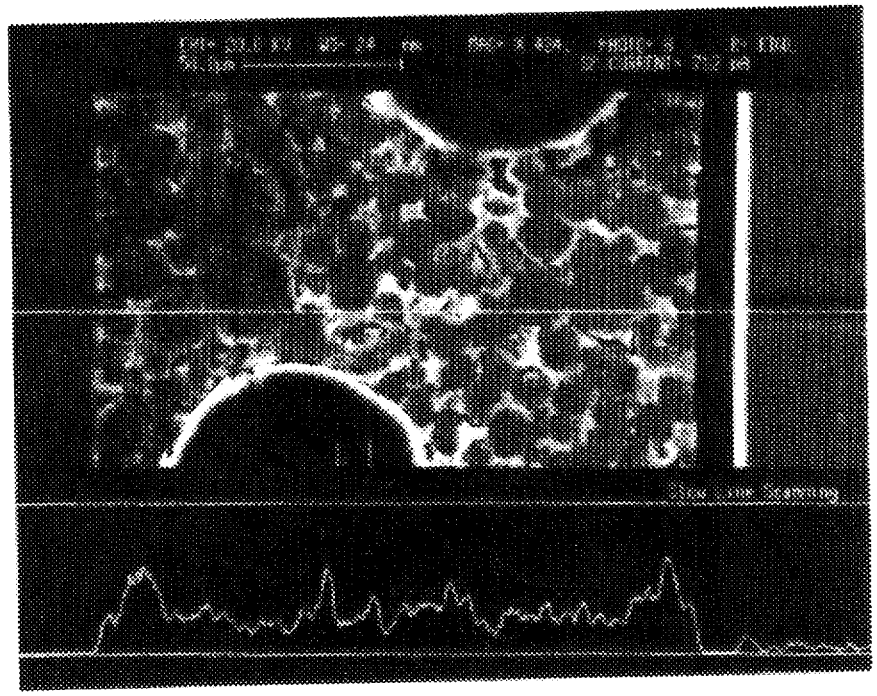
FIG. 1 is an electron micrograph of a section of a modified membrane of Example 2 prepared in accordance with the invention showing the relative abundance of silver.

The deposition of silver sulfide throughout the polymer matrix of the Neospeta CMH membrane, produced according to Example 1 was analysed using a Leica S360 SEM fitted with a Link EDX. The time taken for analysis of the sample along the line indicated in FIG. 1 was 25 seconds. The graph at the foot of FIG. 1 represents the EDX analysis results, in counts per second, along the line indicated in the electron photomicrograph. It approximates to relative abundance of the element, in this case silver, where the base line equals 0 counts and the top line (underneath the words 'slow line scanning') equals 512 counts per second.

FIG. 1 is an electron micrograph of a section of the Neosepta CMH membrane with the graph showing the relative abundance of silver across the section. The large circular features at the bottom left and the top right are reinforcing fibres in section. The material surrounding the fibres consists of small spheres of ion exchange material embedded in a continuous PVC rich matrix.

Figure 2:
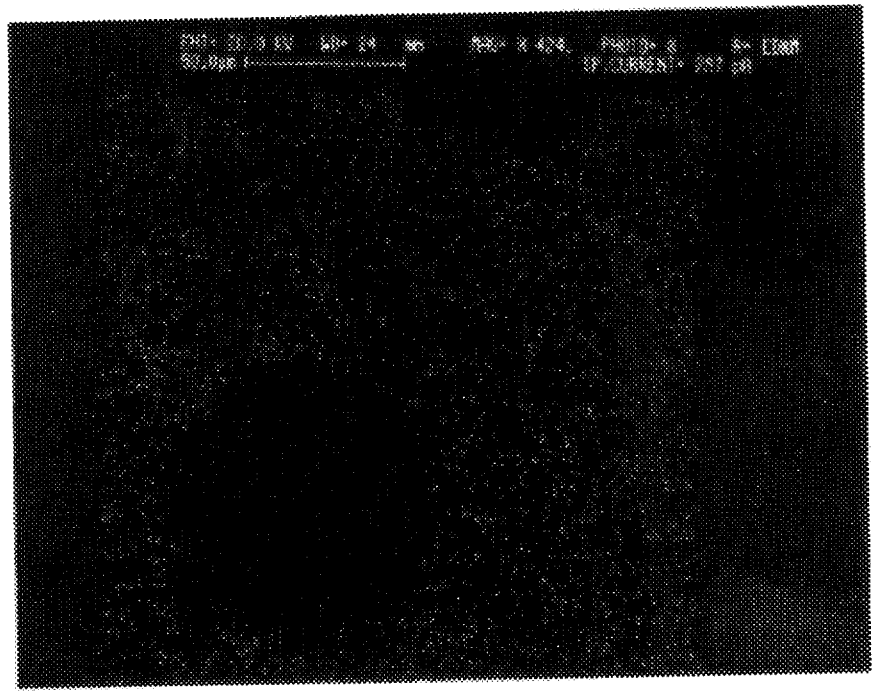
FIG. 2 is an elemental dot map of the membrane of Example 2 showing the distribution of elemental silver.

FIG. 2 is an elemental dot map of the membrane of this Example for silver showing the distribution of elemental silver throughout the polymer matrix.

EXAMPLE 3

A chelate of tungsten with 8-hydroxyquinoline was prepared by adding a 3% solution of 8-hydroxyquinolinol in acetic acid to a solution of $WO^{4-}$ in a buffered solution of acetic acid—acetate at a pH in the range of from 3.3 to 7.5 to precipitate the chelate, which was dissolved in dimethylformamide.

Nafion 117 (DuPont) was immersed in a dilute solution of the tungsten chelate ($7 \times 10^{-2}M$) in dimethyl formamide for 16 hours. The impregnated membrane was then conditioned in a solution of 1M thiourea in DMF for 1 hour, followed by further conditioning in an aqueous solution of 1M thiourea for 15 hours.

The impregnated membrane was then dried and heated to 200° C. for 2 hours in order to decompose the thiourea complex and form tungsten sulfide.

X-ray diffraction analysis of a sample of the membrane produced by this method confirmed the formation of tungsten sulfide within the polymer matrix.

EXAMPLE 4

A chelate of molybdenum with 8-hydroxyquinoline was prepared in the same manner as that described in Example 3 for the preparation of the tungsten chelate.

Nafion 117 was then immersed in a dilute solution of the molybdenum chelate ($7 \times 10^{-2}M$) in dimethylformamide and the procedure of Example 3 repeated.

X-ray diffraction analysis of a sample of the membrane produced by this method confirmed the formation of molybdenum sulfide within the polymer matrix.

We claim:

1. A method of preparing a modified cation exchange membrane having a polymer matrix and a sulfide of silver, tungsten, molybdenum or a mixture thereof deposited within the polymer matrix, which method comprises the steps of:
   i) forming within the polymer matrix of the membrane a complex of silver, tungsten, molybdenum or a mixture thereof with a water soluble compound containing an —SH group; and
   ii) converting the complex formed in the step (i) into the insoluble sulfide of silver, tungsten, molybdenum or a mixture thereof.

2. A method as claimed in claim 1 wherein the complex in step (i) is formed by contacting the cation exchange membrane with a water soluble salt of silver, tungsten, molybdenum, or a mixture thereof, or a solution of a chelate of tungsten or molybdenum, or a mixture thereof, and subsequently contacting the membrane with an aqueous solution of a water soluble compound containing an —SH group.

3. A method as claimed in claim 2 wherein the water soluble salt is silver nitrate.

4. A method as claimed in claim 2 wherein the chelate of tungsten or molybdenum is formed with 8-hydroxyquinoline, toluene-3,4-dithiol or benzoin α-oxime.

5. A method as claimed in claim 1 wherein the water soluble compound used in step (i) is isothiourea, mercaptomethanol, 2-mercaptoethanol, 3-mercaptopropanol, 3-mercaptobutanol, 4-mercaptobutanol, thioformamide, thioacetamide, thiobenzamide, mercaptoacetic acid, 3-mercaptopropanoic acid or 4-mercaptobutanecarboxylic acid.

6. A method as claimed in claim 1 wherein the membrane is dehydrated prior to step (i).

7. A method as claimed in claim 1 wherein the complex formed in step (i) is a silver complex and the conversion in step (ii) to the insoluble sulfide is effected by alkaline hydrolysis.

8. A method as claimed in claim 7 wherein the alkaline hydrolysis is effected using sodium hydroxide or potassium hydroxide.

9. A method as claimed in claim 1 wherein the complex formed in step (i) is a tungsten or molybdenum complex and the conversion in step (ii) to the insoluble sulfide is effected by heat treatment.

10. A method as claimed in claim 9 wherein the heat treatment is carried out at a temperature of 200° C. or above.

* * * * *